(12) United States Patent
Kempf et al.

(10) Patent No.: US 8,776,590 B2
(45) Date of Patent: Jul. 15, 2014

(54) ELECTRONIC UNIT ADAPTED TO BE POSITIONED ON THE INNER FACE OF THE TREAD OF A TIRE

(75) Inventors: Christian Kempf, Toulouse (FR); François Gory, Tournefeuille (FR); Antoine Gouin, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 127 days.

(21) Appl. No.: 13/510,629

(22) PCT Filed: Oct. 7, 2010

(86) PCT No.: PCT/EP2010/006129
§ 371 (c)(1),
(2), (4) Date: Aug. 6, 2012

(87) PCT Pub. No.: WO2011/060850
PCT Pub. Date: May 26, 2011

(65) Prior Publication Data
US 2013/0125640 A1 May 23, 2013

(30) Foreign Application Priority Data
Nov. 20, 2009 (FR) ...................................... 09 05581

(51) Int. Cl.
*B60C 23/02* (2006.01)
(52) U.S. Cl.
USPC ............................................ 73/146.5; 73/146
(58) Field of Classification Search
USPC .................................................. 73/146–146.8
See application file for complete search history.

(56) References Cited

U.S. PATENT DOCUMENTS

| 7,900,665 B2 * | 3/2011 | Shimura ..................... 152/152.1 |
| 8,248,225 B2 * | 8/2012 | Buck et al. ..................... 340/447 |
| 8,387,453 B2 * | 3/2013 | Petrucelli ..................... 73/146.8 |
| 2002/0029626 A1 * | 3/2002 | Koch et al. ....................... 73/120 |
| 2013/0167999 A1 * | 7/2013 | Nakatani et al. ............... 152/450 |

FOREIGN PATENT DOCUMENTS

| JP | 2006/234481 A | 9/2006 |
| WO | 03/095243 A1 | 11/2003 |
| WO | 2008/133314 A1 | 11/2008 |

OTHER PUBLICATIONS

International Search Report, dated Dec. 6, 2010, from corresponding PCT application.

* cited by examiner

*Primary Examiner* — Andre Allen
(74) *Attorney, Agent, or Firm* — Young & Thompson

(57) ABSTRACT

The invention relates to an electronic unit adapted to be positioned on the inner face of a tire tread and incorporating a pressure sensor (10) having a chamber (11) for measuring the pressure inside the tire. This electronic unit includes, in the first place, a housing (6) having a bottom wall (6a) and a side wall (6b) delimiting an open face opposite the bottom wall, the housing being adapted to rest on the tire via its bottom wall (6a) and to house the pressure sensor (10) so that the measuring chamber (11) of the latter opens opposite the open face of the housing (6). Moreover, the electronic unit includes a lid (7) for closing off the open face of the housing (6) pierced with at least one air-inlet opening (18) arranged so as to be offset relative to the measuring chamber (11) of the pressure sensor (10).

20 Claims, 3 Drawing Sheets

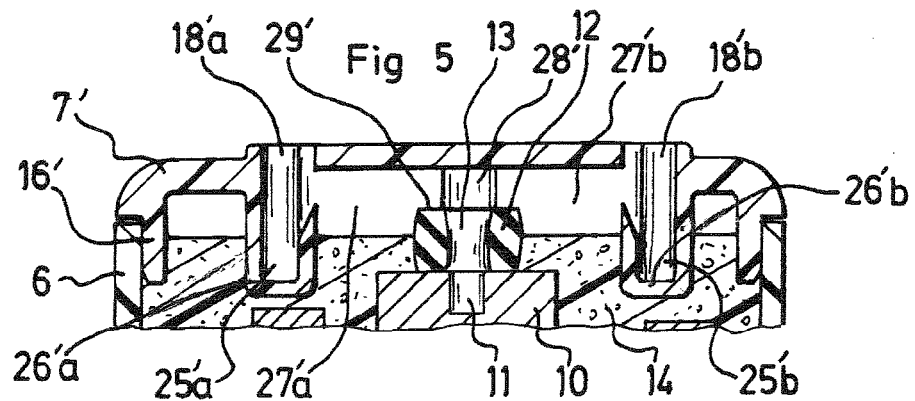
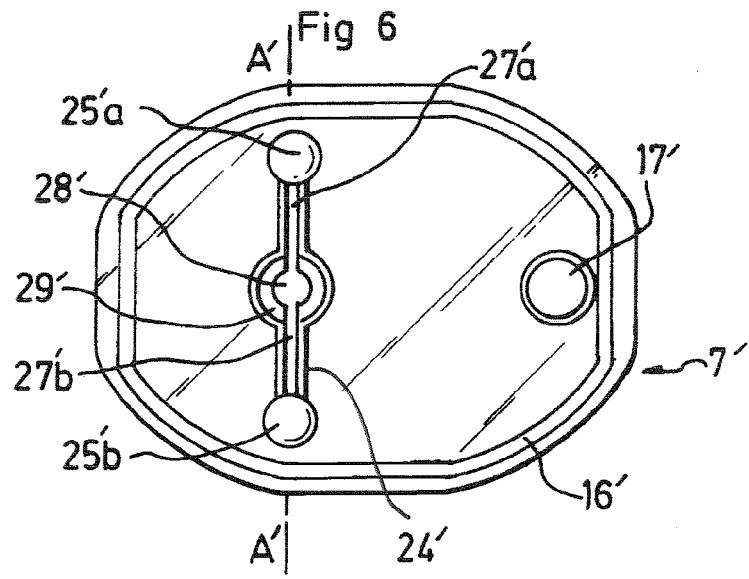
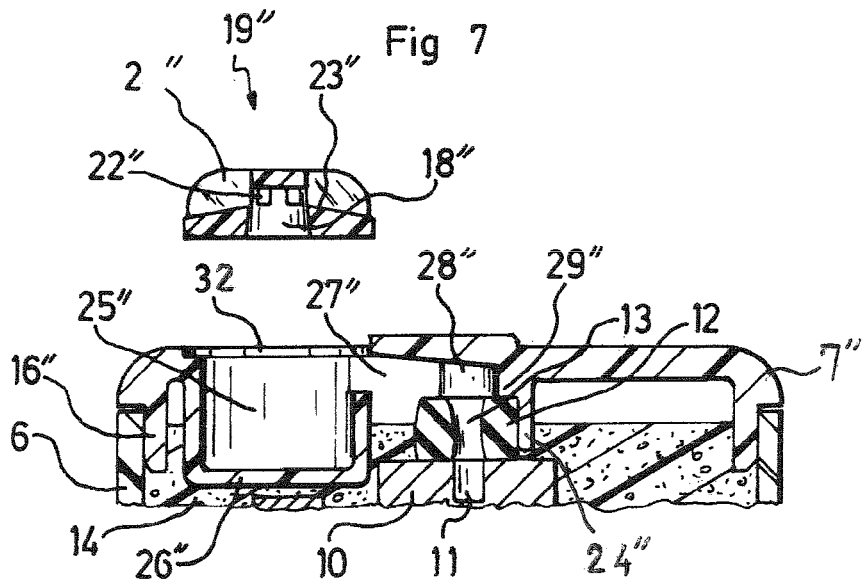

ELECTRONIC UNIT ADAPTED TO BE POSITIONED ON THE INNER FACE OF THE TREAD OF A TIRE

The invention relates to an electronic unit adapted to be positioned on the inner face of a tread of a tire for the purpose of measuring operating parameters of a vehicle wheel fitted with said tire.

BACKGROUND OF THE INVENTION

More and more motor vehicles have monitoring systems comprising electronic units incorporating an electronic circuit board comprising a pressure sensor having a chamber for measuring the pressure inside the tire, said units being mounted on each of the wheels of the vehicles, and dedicated to the measurement of parameters, such as pressure and temperature, of the tires fitted to these wheels.

Currently, these electronic units are conventionally secured to the rims of the wheels, and the solutions used for the attachment consist in attaching them directly to the rims, or in inserting them in cradles themselves attached to the rims, or in incorporating them into the inflation valve systems attached to these rims.

It has however appeared that it could be worthwhile to associate the electronic units not with the rims but with the tires and more particularly to position them on the inner face of the tread of said tires. The solution adopted to retain the electronic units then consists in inserting them in a flexible receptacle bonded to the inner face of the tread of the tire, said receptacle being made of an elastic material capable of forming a "pocket" of retentive shape in which the electronic unit is trapped.

Such a solution perfectly holds the electronic units, but it has however been found that the current electronic units were not designed to meet satisfactorily and notably without requiring an excessive oversizing, the constraints imposed by this new positioning.

SUMMARY OF THE INVENTION

The object of the present invention is to fill this gap and its main objective is to provide an electronic unit with a design adapted to optimally withstand the stresses resulting from a positioning of said electronic unit on the tread of a tire.

Accordingly, the subject of the invention is an electronic unit incorporating an electronic circuit board comprising a pressure sensor having a chamber for measuring the pressure inside the tire, said electronic unit, adapted to be positioned on the inner face of a tread of said tire, comprising:

- a housing having a transverse wall, called the bottom of the housing, and a side wall extending on the periphery of the bottom of the housing and delimiting an open face opposite to said bottom, said housing being adapted to rest on the tire via its bottom and to house the electronic circuit board so that the measuring chamber of the pressure sensor opens opposite its open face,
- a lid for closing off the open face of the housing pierced with at least one air-inlet opening arranged so as to be offset relative to the measuring chamber of the pressure sensor,
- and means for securing the housing and the lid.

The electronic unit according to the invention therefore comprises a housing and a lid both designed so that the housing can rest on the tire via its bottom wall, so that the maximum centrifugal forces are exerted on a very strong structural part consisting of said bottom of the housing.

This arrangement is notably made possible by virtue of the presence and the design of the lid of which each air-inlet opening is arranged so as to be offset relative to the measuring chamber of the pressure sensor, making it possible to position said pressure sensor opposite the open face of the housing while preventing the obstruction of the measuring chamber by the various pollutants, and doing so, despite the exposure of said air-inlet openings to which the particles are naturally directed under the effect of the centrifugal force, and without requiring a filter or any other means capable of clogging.

Moreover, the housing is designed so that the pressure sensor of the electronic circuit board is placed opposite the open face of said housing so that the electric battery powering this electronic circuit board, which constitutes the heaviest element incorporated into the housing, is thus of necessity situated in the bottom of said housing and therefore not likely to move under the effect of the centrifugal forces sustained and to transmit these forces to the other elements, such as the electronic circuit board, incorporated into the housing.

These features lead to an optimization of the structural strength of the electronic unit against the mechanical stresses that operate on it and therefore notably to an optimization of the compactness and hence the weight of this electronic unit.

According to another advantageous feature of the invention, the housing is partially filled with a coating material capable of mechanically immobilizing the elements incorporated into said housing.

Moreover, advantageously according to the invention, on one hand the housing incorporates an annular sleeve extending in protrusion over the electronic circuit board so as to delimit an annular chamber in the extension of the measuring chamber of the pressure sensor, and on the other hand, the coating material is adapted to totally cover the electronic circuit board and to extend around the annular sleeve over a partial height of the latter.

These arrangements lead to providing a prefect mechanical immobilization of all of the components incorporated into the housing with no risk of the coating material penetrating the measuring chamber.

Moreover, the annular sleeve forms a siphon which delimits a reception zone in which the pollutants are held.

According to a first advantageous variant embodiment, the annular sleeve is formed in one piece with the pressure sensor, the latter therefore consisting of a specific component having a "tube" coming out of the measuring chamber.

According to a second advantageous variant embodiment, this annular sleeve consists of an annular seal resting on the electronic circuit board in the extension of the measuring chamber of the pressure sensor, the lid comprising, formed on the underside of the latter, a structure in protrusion with a shape suitable for compressing said annular seal and for delimiting an air-circulation passageway.

According to this embodiment, the pressure sensor consists of a conventional component on which the annular seal is kept compressed so as to prevent the intrusion of coating material in the measuring chamber.

According to another advantageous feature of the invention, the lid has an underside and the housing has an internal arrangement, these two elements being adapted to delimit an air duct between each air-inlet opening of the lid and the measuring chamber of the pressure sensor.

This arrangement leads to the creation of a channel making it possible to divert the movement of the air inside the housing and also constitutes a partitioning for isolation and hence protection of elements incorporated into the housing, such as the radio antenna conventionally used for the communications between the electronic unit and a central unit installed onboard the vehicle.

Moreover, each air duct forms, at least level with each air-inlet opening of the lid, a receptacle having, from the underside of the lid, a depth greater than the minimal depth of said air duct. Such receptacles in effect form reception zones for the pollutants and are used to retain the latter.

According to one advantageous embodiment of the invention aimed at forming the air ducts:

the inner arrangement of the housing is achieved by a partial filling of said housing by means of the coating material, adapted so that said coating material forms a surface defining the bottom of each air duct, and a structure with a height adapted to partially penetrate the coating material is arranged on the underside of the lid, on a contour adapted to laterally delimit each air duct.

This embodiment simply requires the production of a structure on the underside of the lid and controlling the rate of filling with coating material so that the latter forms a surface defining the bottom of each air duct.

Moreover, the structure formed on the underside of the lid advantageously forms an enclosure forming the terminal section of each air duct, inside and over a partial height of which the annular seal extends.

Such an enclosure delimited by a section of the structure arranged on the underside of the lid forms a chamber having an air inlet opening above the annular seal, and therefore positioned high up relative to the bottom of the air duct supplying this enclosure, so that the pollutants are held inside said air duct.

According to another advantageous embodiment of the invention, each of the receptacles formed level with an air-inlet opening consists of an enclosure formed on the underside of the lid, with a depth greater than that of the air duct of which said enclosure forms the initial section.

Such receptacles formed in a single piece with the lid have the particular feature of having a perfectly defined and controlled volume irrespective of the level of filling of the housing with coating material. This design therefore does not require the level of this coating material to be controlled perfectly, which benefits from a great tolerance.

According to one advantageous embodiment of the receptacles, each air-inlet opening and the associated receptacle extend coaxially and have one and the same cross section.

According to this principle, the pollutants that are deposited in a receptacle are evacuated by gravity when the housing is at the top of the wheel, so that the receptacles are automatically emptied at times.

According to another advantageous feature of the invention, the lid comprises a protrusion covering each air-inlet opening, pierced with a plurality of radial air ducts relative to said air-inlet opening, arranged so as to open into the latter.

In the first place, the multiplicity of air inlets leads to a reduction in the size of said inlets and therefore the size of the pollutants capable of entering the housing, and consequently to limiting the possibilities of the measuring chamber of the pressure sensor being closed off.

Moreover, the radial ducts form a zigzag which limits the ingress of particles under the effect of centrifugal acceleration.

BRIEF DESCRIPTION OF THE DRAWINGS

Other features, objects and advantages of the invention will emerge from the following detailed description with reference to the appended drawings which represent as nonlimiting examples thereof three preferred embodiments. In these drawings:

FIG. 5 is a section through a transverse plane representing a second embodiment of an electronic unit according to the invention, FIG. 6 is a view from below of the lid of this second embodiment of an electronic unit according to the invention, FIG. 7 is a section through a transverse plane representing a third embodiment of an electronic unit according to the invention.

DETAILED DESCRIPTION OF THE PREFERRED EMBODIMENTS

Figure 1:
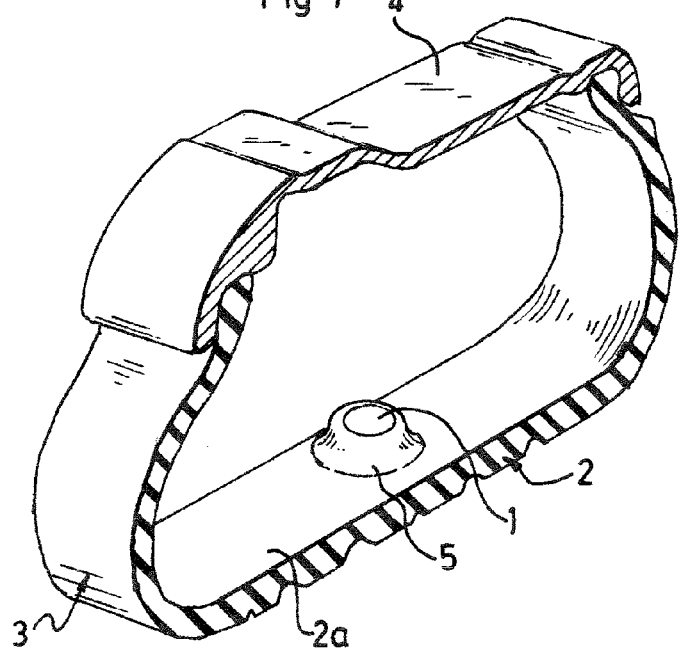
FIG. 1 is a partial view of a vehicle wheel fitted with an electronic unit according to the invention.

The electronic units 1 according to the invention of which three embodiments are shown as examples in the figures are adapted to be positioned on the inner face 2a of a tread 2 of a tire 3 for the purpose of the measurement of operating parameters of a vehicle wheel fitted with said tire mounted on a rim 4.

Accordingly, as shown in FIG. 1, the electronic unit 1 is inserted into a flexible receptacle 5 bonded onto the inner face 2a of the tread 2 of the tire 3, made of an elastic material capable of forming a "pocket" 5, of retentive shape in which said electronic unit is trapped.

Figure 3:
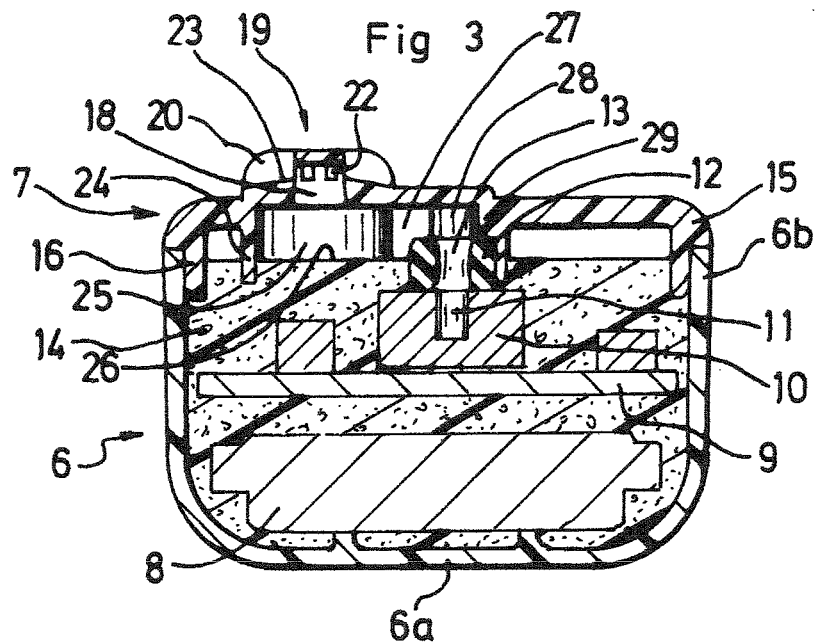
FIG. 3 is a section through a transverse plane A of the first embodiment of the electronic unit according to the invention.

Each of the electronic units 1 according to the invention consists:

of a housing 6 (FIG. 3) comprising a bottom wall 6a of generally elliptical shape and a side wall 6b of constant height, extending on the periphery of the housing bottom 6a and delimiting an open face opposite to said bottom, and of a lid 7 for closing off the open face of the housing 6.

This electronic unit 1 incorporates, housed in the housing 6, a battery 8 placed in the bottom of said housing, and, above this battery 8 relative to the bottom 6a, an electronic circuit board 9 to which is notably connected a pressure sensor 10 having a measuring chamber 11 placed so as to open opposite the open face of said housing.

Moreover, an annular seal 12 made of a compressible material is positioned on the pressure sensor 10 so as to delimit an annular chamber 13 extending in the continuity of the measuring chamber 11 of said pressure sensor.

Lastly, concerning the housing 6, the latter is conventionally designed, after installation of the lid as explained below, to be partially filled with a filling material 14 adapted to coat all of the components, the level of filling also being determined so that a portion of height of the annular seal 12 emerges from said filling material.

As aforementioned, the lid 7 is adapted to close off the open face of the housing 6. This lid 7 has, in the first place, a peripheral edge 15 rounded so as not to form a sharp ridge capable of damaging the flexible pocket 5.

Moreover, a peripheral skirt 16 is formed on the underside of this lid 7 so as to fit into the housing 6, the height of said skirt also being adapted so that the bottom portion of the latter penetrates the coating material 14.

This lid 7 is also pierced with at least one opening 17 (FIG. 4) for the partial filling of the housing with the filling material 14.

This lid 7 is also pierced with at least one air-inlet opening 18 arranged so as to be offset relative to the measuring chamber 11 of the pressure sensor 10. As an example shown in FIGS. 2 to 4, the lid 7 is pierced with a single air-inlet opening 18 offset transversely relative to the measuring chamber 11, and aligned with the latter on a transverse axis parallel to the transverse axis of symmetry of the lid 7.

Positioned above the air-inlet opening 18 (FIG. 2), the lid 7 comprises a dome-shaped protrusion 19 in which radial grooves 21 are arranged (six in number in the example) separated by radial pontoons 20, and communicating with the central air-inlet opening 18 through radial openings 22. Moreover, the bottom 23 of each of these grooves has an upward slope in the direction of the associated opening 22, said slope being adapted to tend to evacuate the particles falling into said grooves.

Lastly, the lid 7 comprises, arranged on the underside of the latter, a structure 24 with a height adapted to partially penetrate the coating material 14, consisting of a rib forming a contour adapted to delimit laterally an air duct extending between the air-inlet opening 18 and the measuring chamber 11, the bottom of which is delimited by the surface 26 of the filling material 14.

Figure 4:
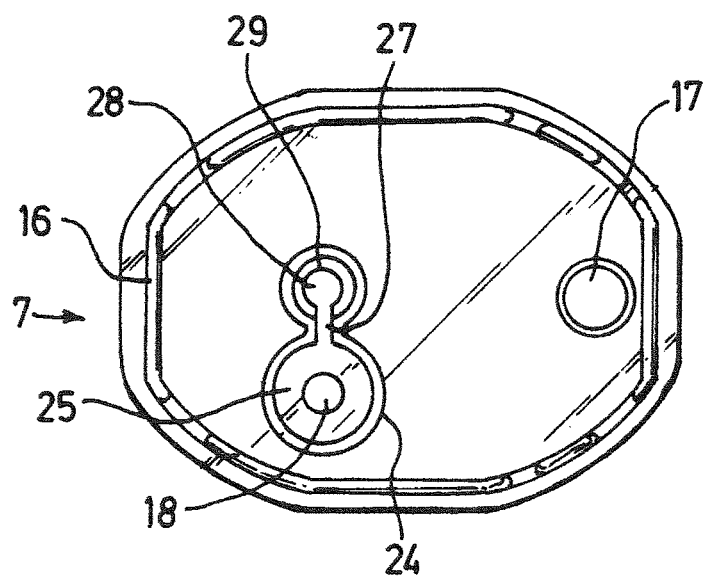
FIG. 4 is a view from below of the lid of this first embodiment of the electronic unit according to the invention.

As shown in FIG. 4, the rib 24 defines a contour with the general shape of an 8 delimiting two annular chambers 25, 28 that are respectively concentric with the air-inlet opening 18 (chamber 25) and the measuring chamber 11 (chamber 28), connected by a linear corridor 27.

Moreover, an annular radial shoulder 29 is formed inside the chamber 28 and adapted to keep the annular seal 12 compressed between said shoulder and the pressure sensor 10.

Figure 2:
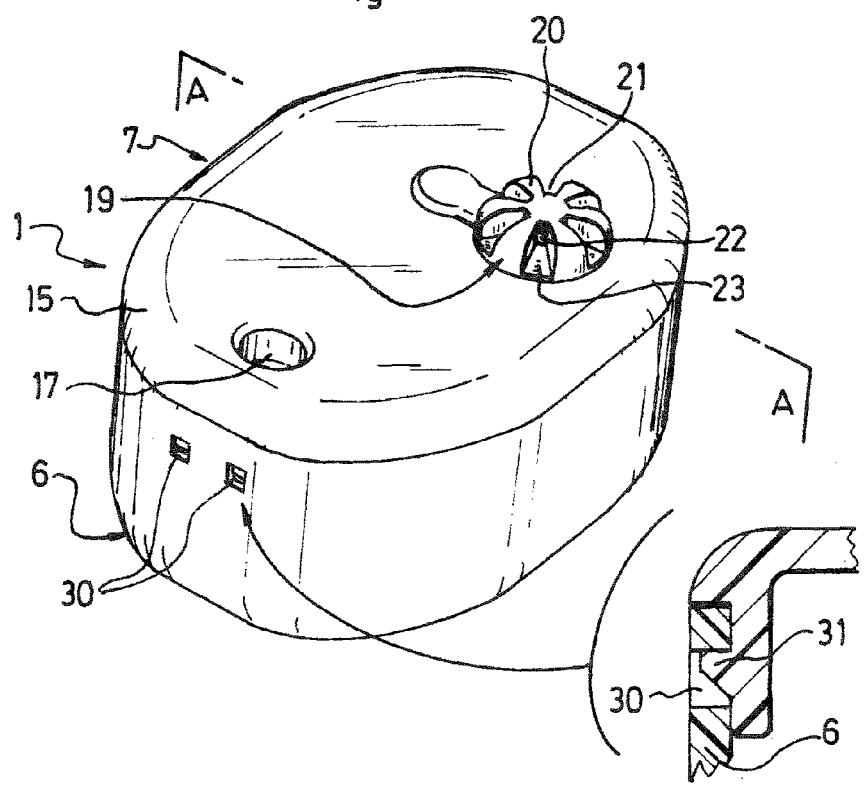
FIG. 2 is a view in perspective of a first embodiment of an electronic unit according to the invention, to which is appended a partial detail of this electronic unit shown in section on an enlarged scale.

Lastly, the housing 6 and the lid 7 are provided with conjugate latching members consisting, as shown in FIG. 2, of latching openings such as 30 provided in the lateral wall 6b of the housing 6 and latching hooks 31 arranged protruding from the external face of the peripheral skirt 16 of the lid 7.

The lid 7 and the housing 6 of this electronic unit 1 are therefore, in a first step, assembled, the annular seal 12 being previously positioned in the chamber 28 of the lid so as to be compressed, after assembly, against the pressure sensor 10.

The housing 6 is then filled with filling material inserted through the filling opening 17 so as to obtain an appropriate partial filling rate so that the filling material 14 extends over a partial height of the annular seal 12.

Once this filling has been carried out, an air duct, designed to divert the movement of the air, and delimited by the rib 24 and the surface 16 of the filling material 14, is formed between the air-inlet opening 18 and the measuring chamber 11.

Moreover, this air duct terminates in a chamber 28 having an air inlet emerging above the annular seal 12 and therefore positioned heightwise relative to the bottom 16 of said air duct so that the sections 25, 27 of the latter situated upstream of this chamber 28 form a receptacle for the pollutants.

The electronic unit shown in FIGS. 5 and 6 is described below using as reference numbers the same references as those used above to designate identical elements and identical references with the addition of the symbol "'" to designate and represent elements with a different structure fulfilling one and the same function as the corresponding elements of the first embodiment.

This electronic unit differs mainly from that described above in that the lid 7' comprises:

two air-inlet openings 18'a, 18'b in line along the same transverse axis and placed symmetrically on either side of the measuring chamber 11 of the pressure sensor 10, and, opposite each opening 18'a, 18'b, a cylindrical receptacle 25'a, 25'b coaxial with said opening and of the same section as the latter, each of said receptacles:
being closed off by a bottom wall 26'a, 26'b,
being made in one piece with the lid 7',
having a height adapted to be partially immersed in the filling material 14.

Moreover, the two receptacles 25'a, 25'b are connected to the chamber 28' concentric with the measuring chamber 11, each by a linear corridor 27'a, 27'b.

According to this principle, the pollutants that are deposited in a receptacle 25'a, 25'b are evacuated by gravity when the housing 6 is at the top of the wheel, so that said receptacles are automatically emptied at times.

Moreover, the receptacles 25'a, 25'b formed in one piece with the lid 7' have the particular feature of having a volume that is perfectly defined and controlled, irrespective of the level of filling of the housing 6 with coating material. This design therefore does not make it necessary to perfectly control the level of this coating material which benefits from a great tolerance.

As above, the electronic unit shown in FIG. 7 is described below using as reference numbers the same references as those used to describe the first embodiment, in order to designate identical elements, and identical references with the addition of the symbol "''" to designate and represent elements of different structure fulfilling one and the same function as the corresponding elements of the first embodiment.

According to this embodiment, a large-volume receptacle 25'' is arranged opposite a single air-inlet opening 18'', said receptacle having a bottom wall 26'' and being made in one piece with the lid 7''.

Moreover, the air-inlet openings 18'', 22'' of this electronic unit are of the same design as those of the first embodiment and are therefore arranged in a dome 19'' forming a protrusion on the top of the lid 7''.

However, for purposes of production by molding of the lid 7'', and because of the presence of the receptacle 25'', the dome 19'' consists of one part made independently that is adapted to fit into a reservation 32 arranged for this purpose in the lid 7''.

Such an electronic unit has the advantage of having a large-volume receptacle 25'' for the pollutants and multiple radial air-inlet openings which result in reducing the size of the pollutants capable of entering the housing 6, and consequently of limiting the possibilities of the measuring chamber 11 of the pressure sensor 10 being closed off.

The invention claimed is:
1. An electronic unit adapted to be positioned on the inner face (2a) of a tread (2) of a tire (3) for the purpose of measuring operating parameters of a vehicle wheel fitted with said tire, said electronic unit incorporating an electronic circuit board (9) comprising a pressure sensor (10) having a chamber (11) for measuring the pressure inside the tire (3) and comprising:
a housing (6) having a transverse wall (6a), called the bottom of the housing, and a side wall (6b) extending on the periphery of the bottom of the housing (6a) and delimiting an open face opposite to said bottom, said housing being adapted to rest on the tire (3) via its bottom (6a) and to house the electronic circuit board (9) so that the measuring chamber (11) of the pressure sensor (10) opens opposite its open face, the housing being partially filled with a coating material (14) that mechanically immobilizes the elements incorporated into said housing;

a lid (7; 7', 7") for closing off the open face of the housing (6) pierced with at least one air-inlet opening (18; 18'a, 18'b; 18") arranged so as to be offset relative to the measuring chamber (11) of the pressure sensor (10); and means (30, 31) for securing the housing (6) and the lid (7), wherein the housing (6) incorporates an annular sleeve (12) extending in protrusion over the electronic circuit board (9) so as to delimit an annular chamber (13) in the extension of the measuring chamber (11) of the pressure sensor (10), and wherein the coating material (14) is adapted to totally cover the electronic circuit board (9) and to extend around the annular sleeve (12) over a partial height of the latter.

2. The electronic unit as claimed in the claim 1, wherein the annular sleeve is formed in one piece with the pressure sensor (10).

3. The electronic unit as claimed in claim 1, wherein the annular sleeve consists of an annular seal (12) resting on the electronic circuit board (9) in the extension of the measuring chamber (11) of the pressure sensor (10), the lid (7; 7', 7") comprising, formed on the underside of the latter, a structure (29; 29'; 29") in protrusion with a shape suitable for compressing said annular seal and for delimiting an air-circulation passageway (27; 27'a, 27'b; 27").

4. The electronic unit as claimed in claim 1, wherein the lid (7; 7'; 7") has an underside and the housing (6) has an internal arrangement, these two elements being adapted to delimit an air duct (24-28; 24', 25'a, 25'b, 26'a, 26'b, 27'a, 27'b, 28'; 24"-28") between each air-inlet opening (18; 18'a, 18'b; 18") of the lid (7; 7'; 7") and the measuring chamber (11) of the pressure sensor (10).

5. The electronic unit as claimed in claim 4, wherein each air duct (24-28; 24', 25'a, 25'b, 26'a, 26'b, 27'a, 27'b, 28'; 24"-28") forms, at least level with each air-inlet opening (18; 18'a, 18'b; 18") of the lid (7; 7'; 7"), a receptacle (26; 26'a, 26'b; 26") having, from the underside of the lid (7; 7'; 7"), a depth greater than the minimal depth of said air duct.

6. The electronic unit as claimed in claim 4, wherein, the inner arrangement of the housing (6) is achieved by a partial filling of said housing by means of the coating material (14), adapted so that said coating material forms a surface defining the bottom of each air duct (24-28; 24', 25'a, 25'b, 26'a, 26'b, 27'a, 27'b, 28'; 24"-28"), and a structure (24; 24'; 24") with a height adapted to partially penetrate the coating material (14) is arranged on the underside of the lid (7), on a contour adapted to laterally delimit each air duct (24-28; 24', 25'a, 25'b, 26'a, 26'b, 27'a, 27'b, 28'; 24"-28").

7. The electronic unit as claimed in claim 6, wherein the annular sleeve consists of an annular seal (12) resting on the electronic circuit board (9) in the extension of the measuring chamber (11) of the pressure sensor (10), the lid (7; 7', 7") comprising, formed on the underside of the latter, a structure (29; 29'; 29") in protrusion with a shape suitable for compressing said annular seal and for delimiting an air-circulation passageway (27; 27'a, 27'b; 27"), and wherein the structure (24; 24'; 24") formed on the underside of the lid (7) forms an enclosure (28; 28'; 28") forming the terminal section of each air duct (24-28; 24', 25'a, 25'b, 26'a, 26'b, 27'a, 27'b, 28'; 24"-28"), inside and over a partial height of which the annular seal (12) extends.

8. The electronic unit as claimed in claim 5, wherein each receptacle consists of an enclosure (26'a, 26'b; 26") formed on the underside of the lid (7), with a depth greater than that of the air duct (24', 25'a, 25'b, 26'a, 26'b, 27'a, 27'b, 28'; 24"-28") of which said enclosure forms the initial section.

9. The electronic unit as claimed in claim 5, wherein each air-inlet opening (18'a, 18'b) and the associated receptacle (26'a, 26'b) extend coaxially and have one and the same cross section.

10. The electronic unit as claimed in claim 1, wherein the lid (7) comprises a protrusion (19) covering each air-inlet opening (18), pierced with a plurality of radial air ducts (21, 22) relative to said air-inlet opening, arranged so as to open into the latter.

11. The electronic unit as claimed in claim 2, wherein the lid (7; 7'; 7") has an underside and the housing (6) has an internal arrangement, these two elements being adapted to delimit an air duct (24-28; 24', 25'a, 25'b, 26'a, 26'b, 27'a, 27'b, 28'; 24"-28") between each air-inlet opening (18; 18'a, 18'b; 18") of the lid (7; 7'; 7") and the measuring chamber (11) of the pressure sensor (10).

12. The electronic unit as claimed in claim 3, wherein the lid (7; 7'; 7") has an underside and the housing (6) has an internal arrangement, these two elements being adapted to delimit an air duct (24-28; 24', 25'a, 25'b, 26'a, 26'b, 27'a, 27'b, 28'; 24"-28") between each air-inlet opening (18; 18'a, 18'b; 18") of the lid (7; 7'; 7") and the measuring chamber (11) of the pressure sensor (10).

13. The electronic unit as claimed in claim 8, wherein each air-inlet opening (18'a, 18'b) and the associated receptacle (26'a, 26'b) extend coaxially and have one and the same cross section.

14. The electronic unit as claimed in claim 2, wherein the lid (7) comprises a protrusion (19) covering each air-inlet opening (18), pierced with a plurality of radial air ducts (21, 22) relative to said air-inlet opening, arranged so as to open into the latter.

15. The electronic unit as claimed in claim 3, wherein the lid (7) comprises a protrusion (19) covering each air-inlet opening (18), pierced with a plurality of radial air ducts (21, 22) relative to said air-inlet opening, arranged so as to open into the latter.

16. The electronic unit as claimed in claim 4, wherein the lid (7) comprises a protrusion (19) covering each air-inlet opening (18), pierced with a plurality of radial air ducts (21, 22) relative to said air-inlet opening, arranged so as to open into the latter.

17. The electronic unit as claimed in claim 5, wherein the lid (7) comprises a protrusion (19) covering each air-inlet opening (18), pierced with a plurality of radial air ducts (21, 22) relative to said air-inlet opening, arranged so as to open into the latter.

18. The electronic unit as claimed in claim 6, wherein the lid (7) comprises a protrusion (19) covering each air-inlet opening (18), pierced with a plurality of radial air ducts (21, 22) relative to said air-inlet opening, arranged so as to open into the latter.

19. The electronic unit as claimed in claim 7, wherein the lid (7) comprises a protrusion (19) covering each air-inlet opening (18), pierced with a plurality of radial air ducts (21, 22) relative to said air-inlet opening, arranged so as to open into the latter.

20. The electronic unit as claimed in claim 8, wherein the lid (7) comprises a protrusion (19) covering each air-inlet opening (18), pierced with a plurality of radial air ducts (21, 22) relative to said air-inlet opening, arranged so as to open into the latter.

\* \* \* \* \*